(12) United States Patent
Kondo

(10) Patent No.: US 11,753,318 B2
(45) Date of Patent: Sep. 12, 2023

(54) **DISINFECTANT AGAINST *LEGIONELLA*, METHOD FOR TREATING WATER, ADDITIVE FOR BATHTUB WATER, AND ADDITIVE FOR AIR-CONDITIONING COOLING TOWER WATER**

(71) Applicant: HIYOSHI CORPORATION, Shiga (JP)

(72) Inventor: Akihiro Kondo, Kusatsu (JP)

(73) Assignee: HIYOSHI CORPORATION, Shiga (JP)

( * ) Notice: Subject to any disclaimer, the term of this patent is extended or adjusted under 35 U.S.C. 154(b) by 727 days.

(21) Appl. No.: 16/630,546

(22) PCT Filed: Dec. 13, 2018

(86) PCT No.: PCT/JP2018/045793
§ 371 (c)(1),
(2) Date: Jan. 13, 2020

(87) PCT Pub. No.: WO2020/044584
PCT Pub. Date: Mar. 5, 2020

(65) Prior Publication Data
US 2021/0061684 A1    Mar. 4, 2021

(30) Foreign Application Priority Data

Aug. 29, 2018   (JP) .................... 2018-160452

(51) Int. Cl.
*C02F 1/50*       (2023.01)
*A01N 59/16*      (2006.01)
*C02F 103/02*     (2006.01)
*C02F 103/42*     (2006.01)

(52) U.S. Cl.
CPC .............. *C02F 1/505* (2013.01); *A01N 59/16* (2013.01); *C02F 2103/023* (2013.01); *C02F 2103/42* (2013.01); *C02F 2303/04* (2013.01)

(58) Field of Classification Search
CPC ............... C02F 1/505; C02F 2103/023; C02F 2103/42; C02F 2303/04
See application file for complete search history.

(56) References Cited

U.S. PATENT DOCUMENTS

| | | |
|---|---|---|
| 6,296,881 B1 | 10/2001 | Hata et al. |
| 2007/0065519 A1 | 3/2007 | Hishida |
| 2011/0236504 A1 | 9/2011 | Hata et al. |
| 2015/0191690 A1 | 7/2015 | El-Etr et al. |

FOREIGN PATENT DOCUMENTS

| | | |
|---|---|---|
| CN | 1565196 | 1/2005 |
| FR | 2 859 634 | 3/2005 |
| JP | 11-29408 | 2/1999 |
| JP | 2000-44417 | 2/2000 |
| JP | 2001-259651 | 9/2001 |
| JP | 2004 154675 | * 6/2004 |
| JP | 2005-254223 | 9/2005 |
| JP | 2007-84493 | 4/2007 |
| JP | 2007-209912 | 8/2007 |
| JP | 2008-264678 | 11/2008 |
| WO | 01/67878 | 9/2001 |
| WO | 2009/133616 | 11/2009 |

OTHER PUBLICATIONS

Kim et al. (Appl Environ Microbiol., 2009, 75(9), 2720-2726) (Year: 2009).*
Itaka, JP 2004 154675, published: Jun. 3, 2004, English machine translation obtained on Jan. 27, 2023. (Year: 2023).*
Supplementary European Search Report dated Mar. 31, 2022 in European Patent Application No. 18 91 9392.
McCoy, William F., "2. Cause" In: "Preventing Legionellosis", Aug. 31, 2005, International Water Association (IWA) [uk], XP0SS907493, ISBN: 978-1-84339-094-7, pp. 11-18.
Caicedo, C. et al., "Occurrence of *Legionella* in wastewater treatment plants linked to wastewater characteristics", Enviornmental Science and Pollution Research, Jul. 4, 2016, vol. 23, No. 16, pp. 16873-16881, XP036024278.
The complete books of industrial chemicals in China, 3rd Edition, 1st volume, Jan. 31, 2005, Front page / Publication data page / p. 524, Chemical Industry Press (CHINA), with partial English language translation.
International Preliminary Report on Patentability dated Mar. 2, 2021 in International (PCT) Application No. PCT/JP2018/045793.
International Search Report (ISR) dated Feb. 19, 2019 in International (PCT) Application No. PCT/JP2018/045793.
Robert Fitzhenry et al., Legionnaires' Disease Outbreaks and Cooling Towers, Emerging Infectious Diseases, vol. 23, No. 11, pp. 1769-1776, Nov. 2017, cited in the specification.
Keiichi Ishii, "Amoeba Zukan" (Amoeba Illustrated Book) 1st edition, published by Kanehara & Co., Ltd., Feb. 26, 1999, together With machine translation of relevant parts, cited in the specification.
Surendra K. Pradhan et al., "Microbial reduction in wastewater treatment using Fe3+ and A13+ coagulants and PAA disinfectant", Journal of Water and Health, vol. 11, No. 4, pp. 581-589, 2013, cited in CA.

* cited by examiner

*Primary Examiner* — Genevieve S Alley
(74) *Attorney, Agent, or Firm* — Wenderoth, Lind & Ponack, L.L.P.

(57) ABSTRACT

Provided is a disinfectant against *Legionella*, including an iron salt as an active ingredient. Examples of the iron salt include ferrous salts such as iron (II) sulfate (ferrous sulfate), and ferric salts such as ammonium iron (III) sulfate (ferric ammonium sulfate). Provided is a method for treating water, including bringing target water into a state in which the target water contains an iron salt or an iron ion, thereby suppressing or inhibiting proliferation of *Legionella* existing in the target water. The present invention can sterilize and disinfect *Legionella* existing in, for example, bathtub water and air-conditioning cooling tower water, with high safety and sense of security in a simple and easy manner.

12 Claims, No Drawings

DISINFECTANT AGAINST *LEGIONELLA*, METHOD FOR TREATING WATER, ADDITIVE FOR BATHTUB WATER, AND ADDITIVE FOR AIR-CONDITIONING COOLING TOWER WATER

TECHNICAL FIELD

The present invention relates to a disinfectant against *Legionella*, a method for treating water, an additive for bathtub water, and an additive for air-conditioning cooling tower water. The present invention can easily suppress or inhibit proliferation of *Legionella* in, for example, bathtub water and air-conditioning cooling tower water.

BACKGROUND ART

*Legionella* is an aerobic gram-negative rod-shaped bacterium, and inhabits widely in soil and lakes and rivers in the natural world. Meanwhile, in artificial environments, *Legionella* may be detected in water utilization equipment such as an air-conditioning cooling tower and a circulating filtration bathtub that generate aerosols. *Legionella* is thought to be causes of opportunistic infections that affect easily-infected hosts such as old adults, organ transplant recipients, and patients having diabetes, and often causes nosocomial infectious diseases. It is known that high exposure thereto may cause pneumonia even in healthy individuals.

For example, there were two outbreaks of *Legionella* disease caused by cooling towers in 2015 in State Legislature in Bronx, New York City (Non-Patent Document 1). Once infection with *Legionella* in cooling tower water occurs, it can affect up to about several tens of patients. Therefore, it is very important to eliminate and prevent *Legionella*.

As a method for sterilizing and disinfecting *Legionella* in, for example, bathtub water and air-conditioning cooling tower water, a method using a chlorine-based disinfectant such as sodium hypochlorite is widely carried out. For another method, sterilization by heating is also carried out. On the other hand, *Legionella* is known to proliferate parasitically in protozoa such as amoeba, and therefore sterilizers and disinfectants are not effective for *Legionella* existing in a protozoan. This is one of the factors that prevent sufficient sterilization and disinfection against *Legionella*.

A method for sterilizing and disinfecting *Legionella* focusing on a protozoan as a host is also proposed. For example, Patent Document 1 discloses a method for inactivating a protozoan, in which sodium hypochlorite is applied to a target liquid (water) to be treated in a circulation-purifying water tank to produce monochloramine at a concentration sufficient to promote encystment of the protozoan. This method inhibits proliferation of amoeba as a host of *Legionella*, resulting in inhibiting proliferation of *Legionella*. Furthermore, Patent Document 2 discloses a method of sterilizing *Legionella* using a metal ion sterilizing apparatus that generates silver ions and copper ions. This method inhibits host amoeba from being fixed to facility using circulating water, resulting in inhibiting proliferation of *Legionella*.

Note here that Non-Patent Document 2 includes information about amoeba as a general. However, Non-Patent Document 2 does not include specific description about amoeba as a host of *Legionella*.

PRIOR ART DOCUMENTS

Patent Documents

Patent Document 1: JP 2008-264678 A
Patent Document 2: JP 2001-259651 A

Non-Patent Documents

Non-Patent Document 1: Emerg Infect Dis. 2017 November; 23(11). 1769-1776
Non-Patent Document 2: "Amoeba Zukan" (Amoeba Illustrated Book) 1st edition by Keiichi Ishii, published by KANEHARA & CO., LTD., Feb. 26, 1999

DISCLOSURE OF INVENTION

Technical Problem

However, some chlorine-based disinfectants have stimulation to human bodies, and have concerns in terms of safety and sense of security. Furthermore, some chlorine-based disinfectants are corrosive to metals, and may damage equipment such as piping. On the other hand, physical treatment by heating or the like is complicated and expensive because it requires a separate heating device or the like. Furthermore, in the case of heat treatment, there is a concern that the piping and the pump may be damaged by exposure to a high temperature.

Thus, the present invention has an object to provide a series of technologies capable of sterilizing and disinfecting *Legionella* with less damage to equipment such as piping and by a simple operation, and superior in terms of safety and sense of security.

Solution to Problem

The inventors have found that by adding various iron salts to a water sample containing *Legionella*, the viable count of *Legionella* in the water sample is drastically decreased. Then, the inventors have established a disinfectant against *Legionella* using an iron salt or an iron ion and a method for treating water, and have reached the completion of the present invention.

One aspect of the present invention is a disinfectant against *Legionella*, including an iron salt as an active ingredient.

Preferably, the iron salt is a ferrous salt.
Preferably, the ferrous salt is at least one selected from the group consisting of iron (II) sulfate, ammonium iron (II) sulfate, and iron (II) chloride.
Preferably, the iron salt is a ferric salt.
Preferably, the ferric salt is at least one selected from the group consisting of iron (III) sulfate, ammonium iron (III) sulfate, iron (III) chloride, and polyferric sulfate.

Another aspect of the present invention is a method for treating water, including: a) bringing target water into a state in which the target water contains an iron salt or an iron ion, thereby suppressing or inhibiting proliferation of *Legionella* existing in the target water.

Preferably, the iron ion is a divalent iron ion ($Fe^{2+}$).
Preferably, the iron ion is a trivalent iron ion ($Fe^{3+}$).
Preferably, step a) includes adding the disinfectant mentioned above to the target water.
Preferably, the target water is bathtub water or air-conditioning cooling tower water.

Preferably, step a) includes bringing the target water into the state in which the target water contains the iron salt or the iron ion so that a concentration of the iron salt or the iron ion is 0.1 mM or more.

Preferably, step a) includes keeping the state in which the target water contains the iron salt or the iron ion for at least 30 minutes.

Another aspect of the present invention is an additive to be added to bathtub water, including the disinfectant mentioned above.

Another aspect of the present invention is an additive to be added to air-conditioning cooling tower water, including the disinfectant mentioned above.

Effect of Invention

The present invention can lessen damage to equipment such as piping and can sterilize and disinfect *Legionella* existing in, for example, bathtub water and air-conditioning cooling tower water, with high safety and sense of security in a very simple and easy manner.

BEST MODE FOR CARRYING OUT THE INVENTION

A disinfectant against *Legionella* of the present invention contains an iron salt as an active ingredient. Furthermore, a method for treating water of the present invention includes bringing target water into a state in which the target water contains an iron salt or an iron ion, thereby suppressing or inhibiting proliferation of *Legionella* existing in the target water.

The iron salt (or iron ion) to be used in the present invention is not particularly limited as long as growth of *Legionella* can be suppressed or inhibited. For example, various ferrous salts ($Fe^{2+}$, divalent iron compounds), various ferric salts ($Fe^{3+}$, trivalent iron compounds) can be used. The iron salt may be a monosalt or a double salt. Furthermore, the iron salt may be hydrate or anhydride.

Examples of the ferrous salt include iron (II) sulfate (ferrous sulfate), ammonium iron (II) sulfate (ferrous ammonium sulfate), and iron (II) chloride (ferrous chloride).

Examples of the ferric salt include iron (III) sulfate (ferric sulfate), ammonium iron (III) sulfate (ferric ammonium sulfate), iron (III) chloride (ferric chloride), and polyferric sulfate.

As to the iron salt mentioned above, only one type of iron salt may be used, or two or more iron salts may be used in combination. For example, two or more types of ferrous salts may be used in combination, or two or more types of ferric salts may be used in combination. The ferrous salt and the ferric salt may be used in combination.

The content of the iron salt in the disinfectant of the present invention is not particularly limited. The disinfectant of the present invention may be composed of only iron salt. An aqueous solution of the iron salt may compose the disinfectant of the present invention.

The form of the disinfectant of the present invention is not particularly limited. For example, a liquid form such as an aqueous solution and a dispersion; and a solid form such as powder and granule; can be adopted. In addition, examples of other possible forms include semi-solid, paste, and gel forms.

The disinfectant of the present invention may further contain components other than ion salt as long as the performance of the disinfectant is not impaired. Examples of the components other than the iron salt include other sterilizer/disinfectant, a surfactant, a buffer agent, alcohol, a carrier, a perfume, and a coloring agent.

In the method for treating water of the present invention, the concentration (final concentration in the water) of an iron salt or an iron ion to be contained in the water may be appropriately set depending on types or states of the target water to be treated, types of the iron salt (or iron ion) to be contained, the retention time (contact time) after an iron salt (or iron ion) is contained, and the like. The concentration is usually 0.1 mM or more, preferably 1.0 mM or more, and more preferably 10 mM or more.

In the method of the present invention, the retention time (contact time) in a state in which an iron salt (or iron ion) is contained in the water may be appropriately set depending on types or states of the target water to be treated, types of the iron salt (or iron ion) to be contained, the concentration of the iron salt (or iron ion) to be contained, and the like. The retention time (contact time) is usually 30 minutes or more, preferably one hour or more, more preferably 6 hours or more, further preferably 12 hours or more, and particularly preferably 24 hours or more. In general, the longer the contact time is, the higher the sterilization action against *Legionella* becomes.

As long as the performance is not impaired, the method of the present invention may be carried out in combination with another method for sterilizing *Legionella*, or another method for suppressing or inhibiting proliferation of amoeba. For example, the method of the present invention can be carried out before or after the treatment with chlorine-based disinfectant. Furthermore, when the method of the present invention is combined with heat-treatment, the method of the present invention can be carried out before or after the heat-treatment, or along with the heat-treatment.

Typical example of target water subject to treatment of the present invention is bathtub water such as circulating bathtub water. In addition, examples of the target water include air-conditioning cooling tower water, water in a fountain, a swimming pool, a jacuzzi, a shower, a hot water supply equipment, a humidifier, water in an air cleaner, and water contained in soil.

When circulating bathtub water is treated, for example, a chemical solution injection port is provided in the middle of a circulation flow path. The disinfectant of the present invention may be injected from the chemical solution injection port, and then the water is circulated for a predetermined time. Injection of the disinfectant may be carried out manually, or automatically in combination with a timer. The disinfectant of the present invention can be continuously or intermittently injected to maintain the iron ion concentration at a predetermined concentration or more. In the case of the other target water such as air-conditioning cooling tower water, the similar configuration can be adopted.

When water of a swimming pool is treated, for example, an iron salt itself may be input into the swimming pool, and may be maintained for a predetermined time. When water contained in soil is treated, for example, the disinfectant of the present invention may be scattered to the soil.

The disinfectant against *Legionella* of the present invention can also be used as an additive for bathtub water. For example, when the disinfectant is added to bathtub water as a bath agent, proliferation of *Legionella* is suppressed or inhibited, and the feel and efficacy like that of hot spring water can be obtained. Furthermore, the disinfectant against *Legionella* of the present invention can be used as an additive for air-conditioning cooling tower water.

Examples of *Legionella* subject to sterilizing of the present invention includes *Legionella pneumophila, Legionella* oakridgensis, *Legionella drozanskii*, *Legionella maceachernii*, *Legionella londiniensis*, *Legionella feeleii*, *Legionella longbeachae*, *Legionella rubrilucens*, *Legionella micdadei*, and *Legionella* sp.

Note here that a mechanism by which the disinfectant of the present invention suppresses or inhibits proliferation of *Legionella* is not clarified. Herein, regarding the effect of an iron salt on proliferation of *Legionella*, BCYEα and GVCP agar media generally used as agar media for *Legionella* contain ferric pyrophosphate. Ferric pyrophosphate is added as a proliferation and development factor for *Legionella*, and is an essential component for proliferation in these media. This suggests that the iron salt has a positive effect on proliferation of *Legionella*, which is different from the effect obtained by the present invention.

Furthermore, *Legionella* is parasitic to protozoa such as amoeba and proliferates therein. However, there are various pieces of information about the effect of iron ions on amoeba. Non-Patent Document 2 introduces a PYG medium (ATCC712) as an amoeba medium, and the medium contains ammonium iron (II) sulfate ($Fe(NH_4)_2(SO_4)_2 \cdot 6H_2O$). The PYG medium is generally used as a medium for acanthamoeba.

On the other hand, Non-Patent Document 2 mentions that excess Fe is lethal to freshwater amoeba, and that an iron ion is fatal to amoeba (see page 92 and page 104). However, no grounds such as experimental data are shown, and it is not clear in what amoeba this phenomenon occurs. Furthermore, the description is in contradiction to the fact that the above-described PYG medium (ATCC712) contains ammonium iron (II) sulfate. In addition, no other documents mention that an iron ion is lethal to amoeba. It can be said that this shows at least that iron ions are not lethal to all amoebas.

Thus, each description of Non-Patent Document 2 gives no suggestion to the effect of iron ions on at least an amoeba as a host of *Legionella*, and an amoeba containing *Legionella*.

The present invention includes use of an iron salt for disinfection against *Legionella*.

In the following, the present invention will be described more specifically by way of Examples. However, the present invention is not limited to these Examples.

EXAMPLE 1

One liter of water tank liquid derived from bathtub water in which amoeba and *Legionella* coexist was collected, and dispensed into five sterile plastic containers of 200 mL each. A predetermined amount of iron (II) sulfate heptahydrate ($FeSO_4 \cdot 7H_2O$) was added and dissolved in test water in each container, and the resultant product was incubated at 35° C. for 24 hours. The final concentration of iron (II) sulfate (final concentration of $Fe^{2+}$) in each test water was as follows.

Test water No. 1: 0 (no additives; control)

Test water No. 2-1: 0.18 mM (10 mg of $FeSO_4 \cdot 7H_2O$ was added)

Test water No. 2-2: 0.18 mM (10 mg of $FeSO_4 \cdot 7H_2O$ was added)

Test water No. 3-1: 1.8 mM (100 mg of $FeSO_4 \cdot 7H_2O$ was added)

Test water No. 3-2: 1.8 mM (100 mg of $FeSO_4 \cdot 7H_2O$ was added)

The water after the incubation was sucked and filtrated using a sterilized funnel provided with a sterilized membrane filter (pore size: 0.2 μm). Suction was stopped immediately after finish of filtration, and then the filter was removed from the funnel with sterilized tweezers. This filter was placed in a sterilized 50-mL plastic container containing 4 mL of sterile purified water and a sterilized stirrer. The plastic container was stirred with a vortex mixer for one minute, so that *Legionella* on the filter was collected into purified water. The resulting solution was used as concentrated test water.

Before culturing, acid treatment was carried out to suppress contaminating bacteria. Specifically, 1 mL of acid treatment liquid (0.2 M HCl·KCl buffer (pH2.2)) and 1 mL of concentrated test water were mixed with each other, and the mixture was left at room temperature for about five minutes to obtain acid-treated concentrated test water. The acid-treated concentrated test water in the amount of 200 μL each was seeded into two sheets of WYOα agar media and applied uniformly using a sterilized conlarge rod and turntable. Petri dish after application was stood still in an incubator at 36° C.±1° C. On day 5, colonies presumed to be *Legionella* were counted.

Then, the same colony presumed to be *Legionella* on the WYOα a agar medium was picked up and seeded on both a sheep blood agar medium (L-cysteine-free medium) and a BCYEα agar medium. Petri dish after seeding was stood still in an incubator at 36° C.±1° C. for 24 hours to carry out streak culture. After culturing, gram-negative rod-shaped bacterium, which had not grown in the sheep blood agar medium and grown only in the BCYEα agar medium, was determined as *Legionella.*

The number of colonies of *Legionella* per 100 mL of the test water (CFU/100 mL) was calculated.

Results are shown in Table 1. In the test water containing iron (II) sulfate, growth of *Legionella* was greatly suppressed. Even when the concentration of iron (II) sulfate ($Fe^{2+}$ concentration) was 0.18 mM, the effect was observed by 24-hour treatment.

TABLE 1

| Test water No. | Concentration of iron (II) sulfate (mM) | Treatment time (hr) | Number of Legionella (CFU/100 mL) |
|---|---|---|---|
| 1 | 0 | 24 | $2.2 \times 10^4$ |
| 2-1 | 0.18 | 24 | $2.4 \times 10^3$ |
| 2-2 | 0.18 | 24 | $4.4 \times 10^3$ |
| 3-1 | 1.8 | 24 | $9.2 \times 10^2$ |
| 3-2 | 1.8 | 24 | $1.8 \times 10^3$ |

EXAMPLE 2

One liter of water tank liquid derived from bathtub water in which amoeba and *Legionella* coexist was collected, and dispensed into five sterile plastic containers of 200 mL each. A predetermined amount of iron (II) sulfate heptahydrate ($FeSO_4 \cdot 7H_2O$) was added and dissolved in test water in each container, and the resultant product was incubated at 35° C. for 48 hours. The final concentration of ferrous sulfate (final concentration of $Fe^{2+}$) in each test water was as follows.

Test water No. 4: 0 (no additives; control)

Test water No. 5-1: 1.8 mM (100 mg of $FeSO_4 \cdot 7H_2O$ was added)

Test water No. 5-2: 1.8 mM (100 mg of $FeSO_4 \cdot 7H_2O$ was added)

Test water No. 6-1: 18 mM (1000 mg of $FeSO_4 \cdot 7H_2O$ was added)

Test water No. 6-2: 18 mM (1000 mg of $FeSO_4 \cdot 7H_2O$ was added)

Then, the same operation as in Example 1 was carried out, and the number of colonies of *Legionella* per 100 mL of the test water (CFU/100 mL) was calculated.

Results are shown in Table 2. In the test water containing iron (II) sulfate, growth of *Legionella* was greatly suppressed. In particular, when the concentration of iron (II) sulfate ($Fe^{2+}$ concentration) was 18 mM, the effect was remarkable; the number of bacteria decreased by at least 3 orders of magnitude by 48 hours treatment.

TABLE 2

| Test water No. | Concentration of iron (II) sulfate (mM) | Treatment time (hr) | Number of Legionella (CFU/100 mL) |
|---|---|---|---|
| 4 | 0 | 48 | $4.6 \times 10^4$ |
| 5-1 | 1.8 | 48 | $3.1 \times 10^3$ |
| 5-2 | 1.8 | 48 | $1.2 \times 10^3$ |
| 6-1 | 18 | 48 | 10 |
| 6-2 | 18 | 48 | 35 |

EXAMPLE 3

One liter of water tank liquid derived from bathtub water in which amoeba and *Legionella* coexist was collected, and dispensed into five sterile plastic containers of 200 mL each. A predetermined amount of ammonium iron (III) sulfate dodecahydrate ($FeNH_4(SO_4)_2 \cdot 12H_2O$) was added and dissolved in test water in each container, and the resultant product was incubated at 35° C. for 48 hours. The final concentration of ammonium iron (III) sulfate (final concentration of $Fe^{3+}$) in each test water was as follows.

Test water No. 7: 0 (no additives; control)
Test water No. 8-1: 1.0 mM (100 mg of $FeNH_4(SO_4)_2 \cdot 12H_2O$ was added)
Test water No. 8-2: 1.0 mM (100 mg of $FeNH_4(SO_4)_2 \cdot 12H_2O$ was added)
Test water No. 9-1: 10 mM (1000 mg of $FeNH_4(SO_4)_2 \cdot 12H_2O$ was added)
Test water No. 9-2: 10 mM (1000 mg of $FeNH_4(SO_4)_2 \cdot 12H_2O$ was added)

Then, the same operation as in Example 1 was carried out, and the number of colonies of *Legionella* per 100 mL of the test water (CFU/100 mL) was calculated.

Results are shown in Table 3. In the test water containing ammonium iron (III) sulfate, growth of *Legionella* was greatly suppressed. Even when the concentration of ammonium iron (III) sulfate ($Fe^{3+}$ concentration) was 1 mM, a sufficient effect was obtained.

TABLE 3

| Test water No. | Concentration of ammonium iron (III) sulfate (mM) | Treatment time (hr) | Number of Legionella (CFU/100 mL) |
|---|---|---|---|
| 7 | 0 | 48 | $5.0 \times 10^3$ |
| 8-1 | 1.0 | 48 | 5 |
| 8-2 | 1.0 | 48 | 5 |
| 9-1 | 10 | 48 | 0 |
| 9-2 | 10 | 48 | 0 |

EXAMPLE 4

One liter of water tank liquid derived from bathtub water in which amoeba and *Legionella* coexist was collected, and dispensed into five sterile plastic containers of 200 mL each. A predetermined amount of ammonium iron (II) sulfate hexahydrate $Fe(NH_4)_2(SO_4)_2 \cdot 6H_2O$ was added and dissolved in test water in each container, and the resultant product was incubated at 35° C. for 48 hours. The final concentration of ammonium iron (II) sulfate (final concentration of $Fe^{2+}$) in each test water was as follows.

Test water No. 10: 0 (no additives; control)
Test water No. 11-1: 1.3 mM (100 mg of $Fe(NH_4(SO_4)_2(SO_4)_2 \cdot 6H_2O$ was added)
Test water No. 11-2: 1.3 mM (100 mg of $Fe(NH_4(SO_4)_2(SO_4)_2 \cdot 6H_2O$ was added)
Test water No. 12-1: 13 mM (1000 mg of $Fe(NH_4(SO_4)_2(SO_4)_2 \cdot 6H_2O$ was added)
Test water No. 12-2: 13 mM (1000 mg of $Fe(NH_4(SO_4)_2(SO_4)_2 \cdot 6H_2O$ was added)

Then, the same operation as in Example 1 was carried out, and the number of colonies of *Legionella* per 100 mL of the test water (CFU/100 mL) was calculated.

Results are shown in Table 4. In the test water containing ammonium iron (II) sulfate, growth of *Legionella* was greatly suppressed. Even when the concentration of ammonium iron (II) sulfate ($Fe^{2+}$ concentration) was 1.3 mM, a sufficient effect was obtained.

TABLE 4

| Test water No. | Concentration of ammonium iron (II) sulfate (mM) | Treatment time (hr) | Number of Legionella (CFU/100 mL) |
|---|---|---|---|
| 9 | 0 | 48 | $5.6 \times 10^3$ |
| 10-1 | 1.3 | 48 | 60 |
| 10-2 | 1.3 | 48 | $1.7 \times 10^2$ |
| 11-1 | 13 | 48 | 25 |
| 11-2 | 13 | 48 | 30 |

EXAMPLE 5

Eight hundred milliliter (800 mL) of water tank water derived from air-conditioning cooling tower water in which amoeba and *Legionella* coexist was collected, and dispensed into four sterile plastic containers of 200 mL each. A predetermined amount of iron (III) chloride hexahydrate ($FeCl_3 \cdot 6H_2O$) was added and dissolved in test water in each container, and the resultant product was incubated at room temperature for 72 hours. The final concentration of iron (III) chloride (final concentration of $Fe^{3+}$) in each test water was as follows.

Test water No. 12: 0 (no additives; control)
Test water No. 13-1: 0.1 mM (2.7 mg of $FeCl_3 \cdot 6H_2O$ was added)
Test water No. 13-2: 0.1 mM (2.7 mg of $FeCl_3 \cdot 6H_2O$ was added)
Test water No. 14-1: 1.0 mM (27 mg of $FeCl_3 \cdot 6H_2O$ was added)
Test water No. 14-2: 1.0 mM (27 mg of $FeCl_3 \cdot 6H_2O$ was added)
Test water No. 15-1: 10 mM (270 mg of $FeCl_3 \cdot 6H_2O$ was added)
Test water No. 15-2: 10 mM (270 mg of $FeCl_3 \cdot 6H_2O$ was added)

Then, the same operation as in Example 1 was carried out, and the number of colonies of *Legionella* per 100 mL of the test water (CFU/100 mL) was calculated.

Results are shown in Table 5. In the test water containing iron (III) chloride, growth of *Legionella* was greatly suppressed. Even when the concentration of iron (III) chloride ($Fe^{3+}$ concentration) was 0.1 mM, an effect was obtained by 72-hour treatment.

TABLE 5

| Test water No. | Concentration of iron (III) chloride (mM) | Treatment time (hr) | Number of Legionella (CFU/100 mL) |
|---|---|---|---|
| 12 | 0 | 72 | $1.1 \times 10^4$ |
| 13-1 | 0.1 | 72 | $5.2 \times 10^3$ |
| 13-2 | 0.1 | 72 | $4.7 \times 10^3$ |
| 14-1 | 1.0 | 72 | $4.3 \times 10^3$ |
| 14-2 | 1.0 | 72 | $3.9 \times 10^3$ |
| 15-1 | 10 | 72 | 10 |
| 15-2 | 10 | 72 | 10 |

EXAMPLE 6

Six hundred milliliter (600 mL) of water tank water derived from air-conditioning cooling tower water in which amoeba and *Legionella* coexist was collected, and dispensed into three plastic containers of 200 mL each. A predetermined amount of iron (II) sulfate heptahydrate ($FeSO_4 \cdot 7H_2O$) was added and dissolved in test water in each container, and the resultant product was incubated at room temperature for 72 hours. The final concentration of iron (II) sulfate (final concentration of $Fe^{3+}$) in each test water was as follows.

Test water No. 16: 0 (no additives; control)
Test water No. 17-1: 1.0 mM (27.8 mg of $FeSO_4 \cdot 7H_2O$ was added)
Test water No. 17-2: 1.0 mM (27.8 mg of $FeSO_4 \cdot 7H_2O$ was added)
Test water No. 18-1: 10 mM (278 mg of $FeSO_4 \cdot 7H_2O$ was added)
Test water No. 18-2: 10 mM (278 $FeSO_4 \cdot 7H_2O$ was added)

Then, the same operation as in Example 1 was carried out, and the number of colonies of *Legionella* per 100 mL of the test water (CFU/100 mL) was calculated.

Results are shown in Table 6. In the test water containing iron (II) sulfate, growth of *Legionella* was greatly suppressed. Even when the concentration of iron (II) sulfate ($Fe^{3+}$ concentration) was 1.0 mM, an effect was obtained by 72-hour treatment.

TABLE 6

| Test water No. | Concentration of iron (II) sulfate (mM) | Treatment time (hr) | Number of Legionella (CFU/100 mL) |
|---|---|---|---|
| 16 | 0 | 72 | $8.8 \times 10^3$ |
| 17-1 | 1.0 | 72 | $3.2 \times 10^3$ |
| 17-2 | 1.0 | 72 | $3.8 \times 10^3$ |
| 18-1 | 10 | 72 | $8.9 \times 10^2$ |
| 18-2 | 10 | 72 | $1.1 \times 10^3$ |

EXAMPLE 7

One liter of water tank water derived from air-conditioning cooling tower water in which amoeba and *Legionella* coexist was collected, and dispensed into five sterile plastic containers of 200 mL each. A predetermined amount of polyferric sulfate solution (general formula: $[Fe_2(OH)_n(SO_4)_{3-n/2}]_m$; whole iron: 11.2%, sulfuric acid ion: 26.4%) was added and stirred in test water in each container, and the resultant product was incubated at room temperature for 23 hours. The final concentration of iron (III) ion (final concentration of $Fe^{3+}$) in each test water was as follows.

Test water No. 19: 0 (no additives; control)
Test water No. 20-1: diluted to 1/10000 of the stock solution (final concentration of $Fe^{3+}$: about 0.0011%)
Test water No. 20-2: diluted to 1/10000 of the stock solution (final concentration of $Fe^{3+}$: about 0.0011%)
Test water No. 21-1: diluted to 1/1000 of the stock solution (final concentration of $Fe^{3+}$: about 0.0011%)
Test water No. 21-2: diluted to 1/1000 of the stock solution (final concentration of $Fe^{3+}$: about 0.011%)
Test water No. 22-1: diluted to 1/100 of the stock solution (final concentration of $Fe^{3+}$: about 0.11%)
Test water No. 22-2: diluted to 1/100 of the stock solution (final concentration of $Fe^{3+}$: about 0.11%)
Test water No. 23-1: diluted to 1/10 of the stock solution (final concentration of $Fe^{3+}$: about 1.1%)
Test water No. 23-2: diluted to 1/10 of the stock solution (final concentration of $Fe^{3+}$: about 1.1%)

Then, the same operation as in Example 1 was carried out, and the number of colonies of *Legionella* per 100 mL of the test water (CFU/100 mL) was calculated.

Results are shown in Table 7. In the test water containing iron (III) ion, growth of *Legionella* was greatly suppressed. Even when the concentration of iron (III) ion ($Fe^{3+}$ concentration) was about 0.0011%, an effect was obtained by 23-hour treatment.

TABLE 7

| Test water No. | $Fe^{3+}$ concentration (%) | Treatment time (hr) | Number of Legionella (CFU/100 mL) |
|---|---|---|---|
| 19 | 0 | 23 | $6.5 \times 10^3$ |
| 20-1 | 0.0011 | 23 | $2.9 \times 10^3$ |
| 20-2 | 0.0011 | 23 | $3.7 \times 10^3$ |
| 21-1 | 0.011 | 23 | $1.2 \times 10^3$ |
| 21-2 | 0.011 | 23 | $1.3 \times 10^3$ |
| 22-1 | 0.11 | 23 | 40 |
| 22-2 | 0.11 | 23 | 30 |
| 23-1 | 1.1 | 23 | 0 |
| 23-2 | 1.1 | 23 | 10 |

The invention claimed is:

1. A method for treating water, comprising:
   a) bringing a non-naturally occurring target water into a state in which the non-naturally occurring target water contains an iron salt in a concentration of 0.1 mM or more, thereby suppressing or inhibiting proliferation of *Legionella* existing in the non-naturally occurring target water,
   wherein the iron salt is at least one selected from the group consisting of iron (II) sulfate, ammonium iron (II) sulfate, ammonium iron (III) sulfate, iron (III) chloride, and polyferric sulfate.

2. The method according to claim 1, wherein the non-naturally occurring target water is bathtub water or air-conditioning cooling tower water.

3. The method according to claim 1, wherein step a) comprises keeping the state in which the non-naturally occurring target water contains the iron salt in the concentration of 0.1 mM or more for at least 30 minutes.

4. The method according to claim 1, wherein the iron salt is at least one selected from the group consisting of iron (II) sulfate and ammonium iron (II) sulfate.

5. The method according to claim 1, wherein the iron salt is at least one selected from the group consisting of ammonium iron (III) sulfate, iron (III) chloride, and polyferric sulfate.

6. The method according to claim 1, wherein the non-naturally occurring target water is at least one selected from the group consisting of bathtub water, air-conditioning cooling tower water, fountain water, swimming pool water, jacuzzi water, shower water, supply equipment water, humidifier water and air cleaner water.

7. A method for treating water, comprising:

adding a disinfectant against *Legionella* to a non-naturally occurring target water, wherein the disinfectant comprises, as an active ingredient, at least one iron salt selected from the group consisting of iron (II) sulfate, ammonium iron (II) sulfate, ammonium iron (III) sulfate, iron (III) chloride, and polyferric sulfate, and bringing the non-naturally occurring target water into a state in which the non-naturally occurring target water contains the iron salt in a concentration of 0.1 mM or more, thereby suppressing or inhibiting proliferation of *Legionella* existing in the non-naturally occurring target water.

8. The method according to claim 7, wherein the iron salt is at least one selected from the group consisting of iron (II) sulfate and ammonium iron (II) sulfate.

9. The method according to claim 7, wherein the iron salt is at least one selected from the group consisting of ammonium iron (III) sulfate, iron (III) chloride, and polyferric sulfate.

10. The method according to claim 7, wherein the non-naturally occurring target water is bathtub water or air-conditioning cooling tower water.

11. The method according to claim 7, further comprising keeping the state in which the non-naturally occurring target water contains the iron salt in the concentration of 0.1 mM or more for at least 30 minutes.

12. The method according to claim 7, wherein the non-naturally occurring target water is at least one selected from the group consisting of bathtub water, air-conditioning cooling tower water, fountain water, swimming pool water, jacuzzi water, shower water, supply equipment water, humidifier water and air cleaner water.

* * * * *